US009037823B2

(12) United States Patent
Vipat et al.

(10) Patent No.: US 9,037,823 B2
(45) Date of Patent: May 19, 2015

(54) PROTECTING IAT/EAT HOOKS FROM ROOTKIT ATTACKS USING NEW CPU ASSISTS

(75) Inventors: Harshawardhan Vipat, San Jose, CA (US); Ravi L. Sahita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 13/615,928

(22) Filed: Sep. 14, 2012

(65) Prior Publication Data

US 2014/0082751 A1 Mar. 20, 2014

(51) Int. Cl.
*G06F 21/52* (2013.01)
*G06F 21/62* (2013.01)

(52) U.S. Cl.
CPC ............. *G06F 21/629* (2013.01); *G06F 21/52* (2013.01)

(58) Field of Classification Search
None
See application file for complete search history.

(56) References Cited

U.S. PATENT DOCUMENTS

| 7,882,318 | B2 * | 2/2011 | Savagaonkar et al. | 711/163 |
|---|---|---|---|---|
| 8,028,174 | B2 * | 9/2011 | Bouchier et al. | 713/194 |
| 2004/0148480 | A1 * | 7/2004 | Watt et al. | 711/163 |
| 2006/0161719 | A1 * | 7/2006 | Bennett et al. | 711/6 |
| 2008/0040565 | A1 * | 2/2008 | Rozas et al. | 711/163 |
| 2008/0244573 | A1 * | 10/2008 | Sahita et al. | 718/1 |
| 2011/0099393 | A1 * | 4/2011 | Tran | 713/300 |
| 2011/0167196 | A1 * | 7/2011 | Scales et al. | 711/6 |
| 2012/0117544 | A1 * | 5/2012 | Kakulamarri et al. | 717/126 |
| 2012/0255031 | A1 * | 10/2012 | Sallam | 726/27 |
| 2012/0260082 | A1 * | 10/2012 | Bobzin | 713/100 |
| 2013/0086299 | A1 * | 4/2013 | Epstein | 711/6 |
| 2013/0132690 | A1 * | 5/2013 | Epstein | 711/159 |
| 2013/0152207 | A1 * | 6/2013 | Cui et al. | 726/26 |
| 2013/0191611 | A1 * | 7/2013 | Liu et al. | 711/206 |
| 2013/0283370 | A1 * | 10/2013 | Vipat et al. | 726/17 |
| 2013/0312098 | A1 * | 11/2013 | Kapoor et al. | 726/24 |
| 2013/0312099 | A1 * | 11/2013 | Edwards et al. | 726/24 |
| 2013/0326614 | A1 * | 12/2013 | Truskovsky et al. | 726/19 |
| 2014/0068612 | A1 * | 3/2014 | TORREY, Jacob | 718/1 |

OTHER PUBLICATIONS

Jisoo Yang and Kang G. Shin. 2008. Using hypervisor to provide data secrecy for user applications on a per-page basis. In Proceedings of the fourth ACM SIGPLAN/SIGOPS international conference on Virtual execution environments (VEE '08). ACM, New York, NY, USA, 71-80.*

(Continued)

*Primary Examiner* — Jason K. Gee
*Assistant Examiner* — Zhimei Zhu
(74) *Attorney, Agent, or Firm* — Grossman, Tucker, Perreault & Pfleger, PLLC (57) ABSTRACT

The present disclosure provides systems and methods for hardware-enforced protection from malicious software. A device may include at least a security validator module and a security initiator module. A call from a process requesting access to information stored in the device may be redirected to the security initiator module, which may cause the device to change from an unsecured view to a secured view. In the secured view the security validator module may determine whether the call came from malicious software. If the call is determined to be valid, then access to the stored information may be permitted. If the call is determined to be invalid (e.g., from malware), the security software may cause the device to return to the unsecured view without allowing the stored information to be accessed, and may take further measures to identify and/or eliminate process code associated with the process that made the invalid call.

25 Claims, 5 Drawing Sheets

(56) References Cited

OTHER PUBLICATIONS

Ryan Riley, Xuxian Jiang, Dongyan Xu, "Guest-Transparent Prevention of Kernel Rootkits with VMM-Based Memory Shadowing", 2008, Recent Advances in Intrusion Detection, Lecture Notes in Computer Science, vol. 5230, pp. 1-20.*

Related PCT application PCT/US2011/64817 filed Dec. 14, 2011, 31 pages.

* cited by examiner

PROTECTING IAT/EAT HOOKS FROM ROOTKIT ATTACKS USING NEW CPU ASSISTS

TECHNICAL FIELD

The present disclosure relates to computer security, and more particularly, to systems for assisting software-based security against malicious software with hardware-enforced protection.

BACKGROUND

Some forms of malicious software (a.k.a., "Malware") may attack computing devices to access personal information, account numbers, etc. For example, malware such as "user-mode rootkits" (e.g., "ZBot," "SpyEye," etc.) may inject malicious code into various ring 3 processes (e.g., user-level security processes having the fewest privileges) that "hook" system application programming interfaces (APIs) that are called by the process. "Hooking" replaces addresses in the import address table (IAT) of the process or in the export address table (EAT) of a shared object (SO), dynamically linked library (DLL), etc. with addresses corresponding to code that is not the intended target of the call. To carry out these operations, malware routinely call certain debug/system APIs. The debug/system APIs provide information to the malware allowing for hooks to be installed. The malware may then simply hide and act as a "man-in-the-middle" by receiving and then passing through calls from various processes, all the while listening for personal information that may be provided to other users for possible illegal or fraudulent uses.

Security software (e.g., anti-malware software) may employ a similar technique to defeat malware. The security software may hook debug/system APIs commonly called by malware to provide a safeguard against their being accessed for improper use. More specifically, the security software may initially be called in place of the debug/system APIs, may determine whether the calling process is malware, and may prevent the debug/system APIs from being accessed if the call is determined to be invalid. This protection solution remains effective as long there is no manner in which to circumvent or compromise the security software. However, security software may be constructed utilizing the same programmatic principals as the software it is meant to protect, and thus, may be vulnerable to infiltration by similar rootkit attacks. As a result, a significant weakness is introduced into the ability of the security software to protect the computing device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure describes systems and methods for hardware-enforced protection from malicious software. In one embodiment, a device may comprise at least a security validator module and a security initiator module. The security validator module may be configured to determine whether processes executing in the device should be granted access to information stored on the device. The security initiator module may be configured to control hardware-enforced security views based on requests to access the stored information received from the executing processes. The hardware-enforced security views may be configured to control how the stored information may be accessed by the executing processes and may include, for example, access permissions enforced by hardware-level security features in the device. For example, in one embodiment the security views may be implemented using extended page table (EPT) functionality present in the certain processors including virtualization technology (e.g., VT-x technology such as offered in various processors manufactured by the Intel Corporation).

The hardware-enforced security views may map the host physical memory as readable, writable and/or executable and may include at least two views: an unsecured view and a secured view. The unsecured view may be the default view and may allow lower privilege software to operate without being able to access certain higher privilege (e.g., trusted) software. For example, the security validator module and stored information may not be executable and/or may not be written to when the unsecured view is active in the device. If an attempt is made to access the security validator module or the stored information when the device is operating in the unsecured view, the processor may be configured to cause hardware-based events to protect the device from, for example, being accessed by untrusted software (e.g., malware). The security validator module and stored information may then again be accessible when the security initiator module causes the device to transition to the secured view.

In one embodiment, either the security validator module or the security initiator module may be configured to replace at least one address corresponding to the stored information in an import address table (IAT) in the device. Replacing the at least one address may result in the security initiator module being called by the executing processes when attempting to access the stored information due to a call to the API invoked via the replaced IAT entry address. Upon being called by an executing process, the security initiator module may initiate a transition from the unsecured view to the secured view. The security validator module and stored information that was not accessible in the unsecured view may then become accessible (e.g., executable and/or writable). The security validator module may then be configured to first determine the validity of the call received from the executing process (e.g., may be configured to determine if the call originated from malware). For example, if the security validator module determines that the call was valid (e.g., not originating from malware), then the executing process may be allowed to access the stored information prior to causing the security initiator module to initiate a transition back from the secured view to the unsecured view. Alternatively, if the security validator module determines that the call was invalid, the security validator module may cause the security initiator module to initiate a transition back from the secured view to the unsecured view without allowing access to the stored information.

Figure 1:
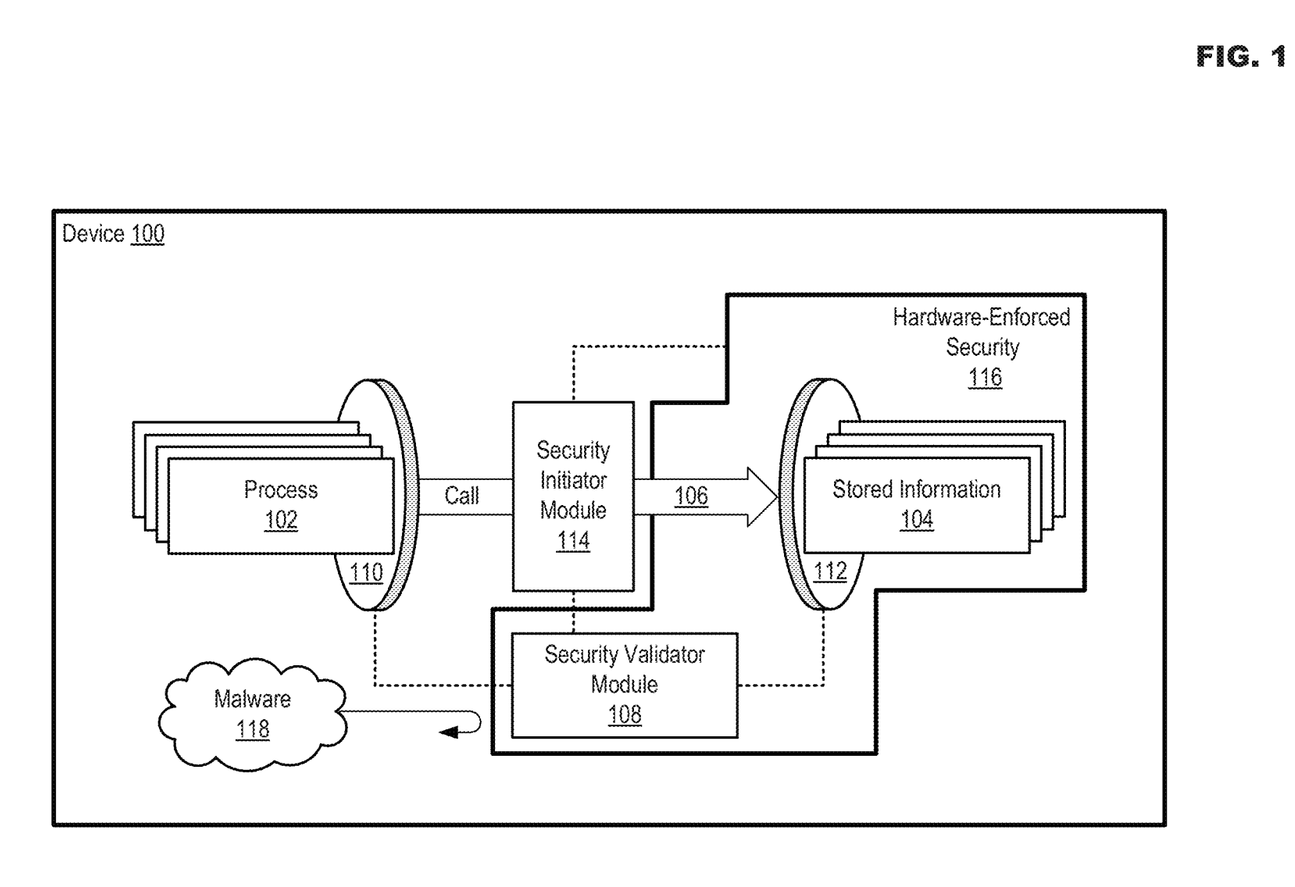
FIG. 1 illustrates an example device configured for hardware-enforced protection from malicious software in accordance with at least one embodiment of the present disclosure.

FIG. 1 illustrates example device 100 configured for hardware-enforced protection from malicious software in accordance with at least one embodiment of the present disclosure. Some examples of device 100 may include, but are not limited to, a mobile communication device such as a cellular handset or smartphone based on the Android® operating system (OS), iOS®, Blackberry® OS, Palm® OS, Symbian® OS, etc., a mobile computing device such as a tablet computer like an ipad®, Galaxy Tab®, Kindle Fire®, etc., an Ultrabook® including a low-power chipset manufactured by Intel Corporation, a netbook, a notebook computer, a laptop computer, etc., a typically stationary computing device such as a desktop computer, server computer, etc.

Generally device 100 may be configured to reinforce software-based protection schemes against malware using hardware-based security resources. FIG. 1 discloses a simplified example of operation wherein at least one process 102 may be executing. Process 102 may comprise one or more processes that are executing as a result of, for example, being triggered automatically by another system in device 100, being triggered by another device (e.g., via wired and/or wireless communication), being manually triggered by a user of device 100, etc. At least one executing process 102 may be, or may contain, malware seeking to corrupt and/or gain access to stored information 104 in device 100. Stored information 104 may include, for example, data and/or executable program code such as an SO or DLL that maybe accessed via a corresponding API. In the course of normal operation, processes 102 may issue a call 106 to stored information 104 whenever certain data and/or functionality are required. Consistent with the present disclosure, security-related software and hardware may work together to permit only valid transactions.

In one embodiment, the security software in device 100 may be divided into at least two example categories: security validator module 108 and security initiator module 114. Security validator module 108 may be configured to, for example, determine if an executing process 102 that desires access to stored information 104 (e.g., via call 106) is malware, and if determined to be malware, to disallow call 106 to stored information 104. For example, security validator module 108 may place hook 110 on at least one IAT corresponding to processes 102, and/or hook 112 on at least one EAT corresponding to stored information 104, that causes call 106 to be routed through security initiator 114. Security validator module 108 and the IAT/EAT may be susceptible to attacks from malware 118 (e.g., a rootkit may attempt to alter the operation of security validator module 108 and/or the configuration of hook 110 and/or 112), and thus, in one embodiment security validator module 108 and/or the IAT/EAT may be inexecutable or unalterable under default working conditions, and executable or alterable only if permitted by hardware-enforced security 116. Security initiator module 114 may be software to which calls from an executing process 102 are redirected by hooks 110 or 112. Security initiator module 114 may be, for example, a "wrapper" program that "wraps" around security validator module 108 and may be configured to perform various functions including, for example, controlling hardware-enforced security 116 (e.g., changing between an unsecured view and a secure view) and causing security validator module 108 to be executed when in the secured view. As illustrated in FIG. 1, stored information 104 may not only be secured by security validator module 108, but may also be protected by hardware-enforced security 116. Moreover, hardware-enforced security 116 may protect security validator module 108 to prevent malware 118 from being able to corrupt security validator module 108. An example of hardware-enforced security 116 will be discussed further with respect to FIGS. 2 and 3.

Figure 2:
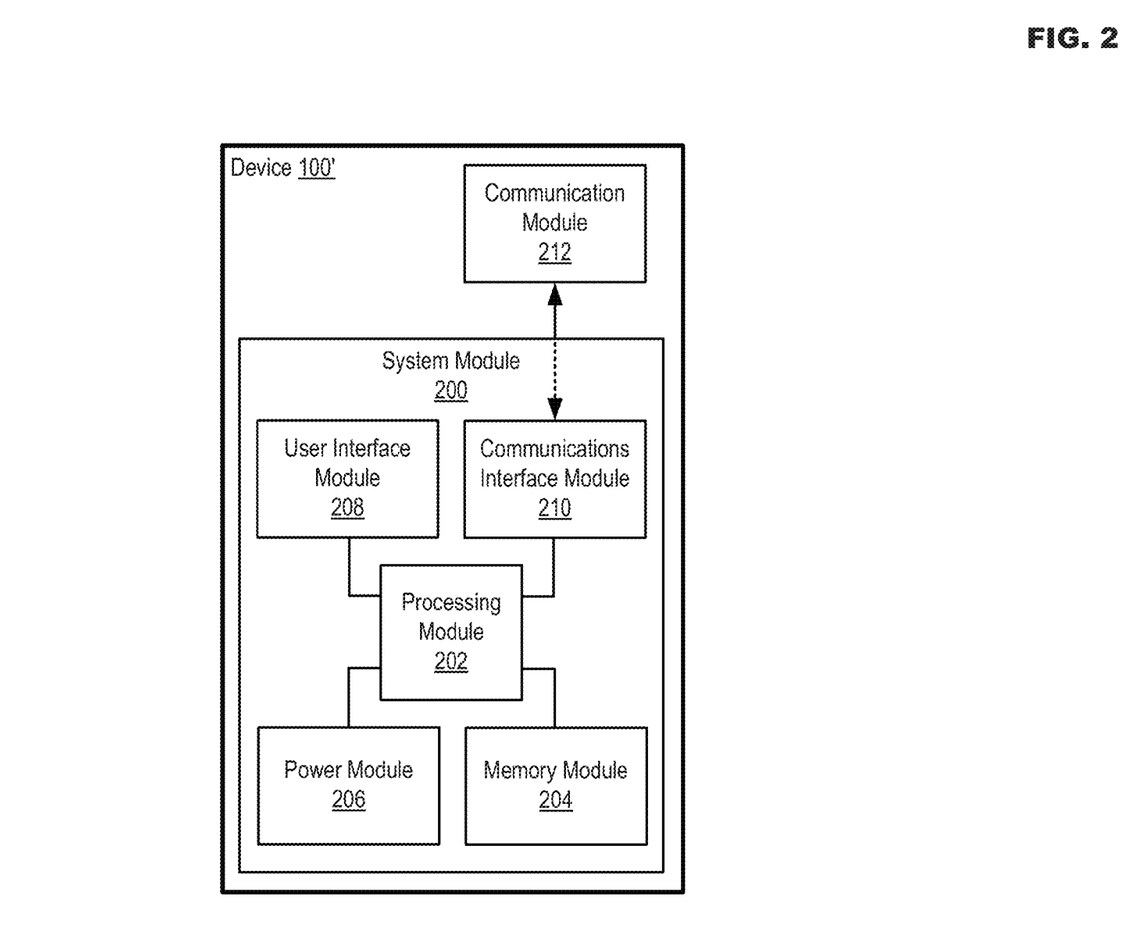
FIG. 2 illustrates an example configuration for a device in accordance with at least one embodiment of the present disclosure.

FIG. 2 illustrates an example configuration for device 100' in accordance with at least one embodiment of the present disclosure. Device 100' may comprise, for example, system module 200 configured to handle baseline operations for device 100'. System module 200 may include, for example, processing module 202, memory module 204, power module 206, user interface module 208 and communication interface module 210 (e.g., which may be further coupled to communication module 212). Processing module 200 may comprise one or more processors situated in separate components, or alternatively, may comprise one or more processing cores embodied in one integrated circuit (IC),for example in a System-on-a-Chip (SOC) configuration, and circuitry configured to support the one or more processors. Example processors may include various x86-based microprocessors available from the Intel Corporation including those in the Pentium, Xeon, Itanium, Celeron, Atom, Core i-series product families. Circuitry configured to support the one or more processors may include interface or bridging circuitry chipsets (e.g., a group of ICs) such as the Northbridge, Southbridge, or subsequently released bridging chipsets from Intel Corporation, that may be configured to handle communications between processing module 202, memory module 204 and other modules communicating on various wired and/or wireless buses in device 100'. For example, bridging circuitry may be configured to handle the signaling between modules by converting from one type/speed of signaling to another, and may be further configured to be compatible with a variety of different devices to allow for different system implementations, upgrades, etc. Some of the functionality described above may also be incorporated within the one or more processors, memory module 204 or other system modules.

Processing module 202 may be configured to execute instructions. Instructions may include program code configured to cause processing module 202 to perform activities such as, but not limited to, reading data, writing data, processing data, formulating data, converting data, transforming data, etc. Information, including instructions, data, etc., may be stored in memory module 204. Memory module 204 may comprise random access memory (RAM) or read-only memory (ROM) in a fixed or removable format. RAM may include memory configured to hold information during the operation of device 100' such as, for example, static RAM (SRAM) or Dynamic RAM (DRAM). ROM may include memories such as computing device bios memory configured to provide instructions when device 100' activates, programmable memories such as electronic programmable ROMs, (EPROMS), Flash, etc. Other fixed and/or removable memory may include magnetic memories such as floppy disks, hard drives, etc., electronic memories such as solid state flash memory (e.g., eMMC, etc.), removable memory cards or sticks (e.g., USB, uSD, etc.), optical memories such as compact disc-based ROM (CD-ROM), holographic, etc.

Power module 206 may include power sources that are internal to device 100' (e.g., a battery) and/or external to device 100' (e.g., electromechanical or solar generator, power grid, etc.) and any related circuitry configured to supply device 100' with power for operation. User interface module 208 may include circuitry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communications interface module 210 may be configured to handle packet routing and other control functions for communication module 212, which may include resources configured to support wired and/or wireless communications. Wired communications may include parallel and serial wired mediums such as, for example, Ethernet, Universal Serial Bus (USB), Firewire, etc. Wireless communications may include, for example, close-proximity wireless mediums (e.g., radio frequency (RF), infrared (IR), optical character recognition (OCR), magnetic readers, etc.), short-range wireless mediums (e.g., Bluetooth, wireless local area networking (WLAN), Wi-Fi, etc.) and long range wireless mediums (e.g., cellular, satellite, etc.). In one embodiment, communications interface module 210 may be configured to prevent wireless communications that are active in communication module 212 from interfering with each other. In performing this function, communications interface module 210 may schedule activities for communication module 212 based on, for example, the relative priority of messages awaiting transmission.

As illustrated in FIG. 1, hardware-enforced security 116 may be configured to protect at least security validator module 108 and stored information 104. In one embodiment, hardware-enforced security 116 may be implemented via functionality provided by hardware virtualization technology (VT-x) available, for example, in various microprocessors manufactured by the Intel Corporation. VT-x functionality allows more than one virtual machine to simultaneously share access to physical processing resources in a safe and efficient manner. Examples of functionality available in VT-x-enabled processors that may be employed in embodiments consistent with the present disclosure are VMX, Extended Page Table (EPT), and Fast View Switch (FVS). While the present disclosure will discuss hardware-enforced protection in terms of features provided by VT-x, the various disclosed embodiments are not limited to implementation using only VT-x. Other hardware (e.g., processors) comprising similar hardware-based security functionality may also be employed in a manner consistent with the various embodiments as disclosed herein.

VT-x may allow more than one VM to run simultaneously on, for example, device 100'. Each VM may be, for example, an occurrence of an operating system (OS). VT-x virtualization architecture may include multiple processor operational modes. VT-x includes VMX, which supports a special privilege mode called VMX-root that can be utilized for executing a privileged software component known as a "hypervisor" or virtual machine manager (VMM) configured to manage the operation of more than one VM running on device 100'. The VMM executes as a "host" in device 100', and thus, has full control of access to modules 202-212. Each OS, which includes ring/privilege structures, may be run as a "guest" in a VMX Non-root mode. Ring security includes various privilege levels from ring 0 kernel security (most privileged) to ring 3 application security (least privileged). Non-root mode is a processing mode allowing VMs to operate under the supervision of the VMM. In non-root mode, certain instructions and processor events may trigger hardware-assisted transitions to VMX Root mode, allowing the VMM to monitor and control access to key processor resources.

Figure 3:
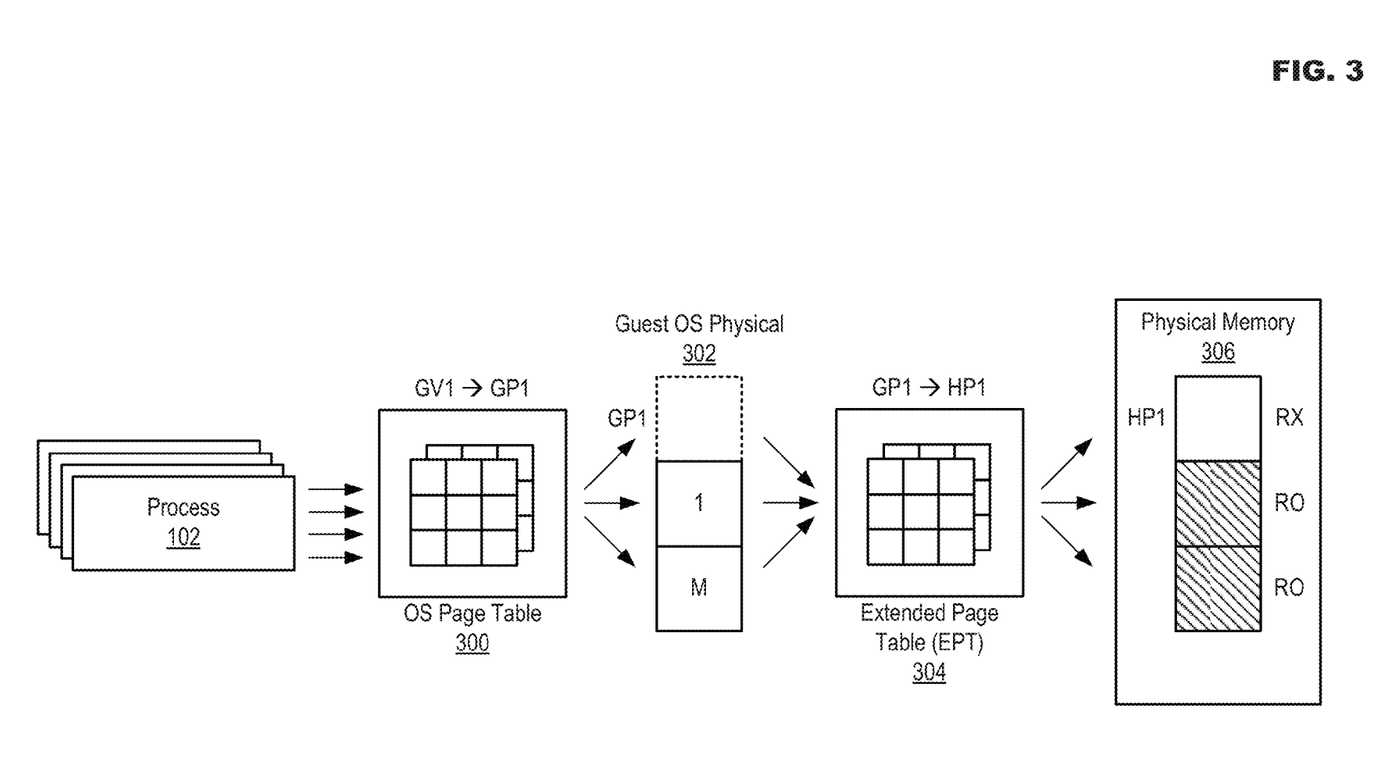
FIG. 3 illustrates an example of how processes executing in a device may be mapped to physical resources in accordance with at least one embodiment of the present disclosure.

EPT is a VT-x feature (e.g., supported by VTx-2 enabled processors) allowing the VMM to specify additional permissions for the memory pages. These permissions may be enforced by hardware in an OS-independent fashion. When a violation of the hardware-enforced permissions occurs, control may then be transferred to the VMM (e.g., in the VMX root mode), providing the VMM an opportunity to intervene and possibly instigate corrective actions. FIG. 3 illustrates an example of how processes executing in device 100 may be mapped to physical resources in accordance with at least one embodiment of the present disclosure. Processes 102 may obtain virtual addresses (e.g., GV1) that are mapped to a guest OS's physical addresses (e.g., GP1) 302 using OS page-table 300. Guest physical addresses 302 may then be mapped to actual physical addresses (HP1) in physical memory 306 (e.g., in memory module 204) using EPT 304. As discussed above, EPT 304 may also specify permissions for guest physical pages in addition to mapping of guest-physical (GP1) to host-physical (HP1) addresses. For example, sections of memory pages may be indicated as read-executable (RX) or read-only (RO), and violations of the permissions set by EPT 304 may, for example, cause the VMM to intervene in the situation and possibly execute corrective action.

The VMM may utilize EPT 304 to, for example, create multiple memory "views" and to "switch" from one view to another. In one embodiment, a memory view may be an instance of EPT, and thus, may be considered to be a permissions map for the physical pages of guest OS. The VMM may create more than one view (e.g., multiple instances of EPT 304) for controlling access to portions of physical memory in memory module 204, and make any one of the views active by simply setting the EPTP field in the virtual machine configuration storage (VMCS). The act of changing permissions for accessing a memory page by changing the active EPT is termed herein as "view-switching." In one embodiment, security software in the guest OS (e.g., security initiator 108) may be configured to communicate with the VMM to create views with different permissions, and may request the VMM to switch views (e.g., to change how memory pages may be accessed). For example, a Fast View Switch (FVS) may be performed using the VM function operation on a processor that allows security initiator 108 to select and activate views without having to first transition to the special privilege mode (e.g., VMX root mode), which reduces the amount of delay caused by switching.

System API functions in an OS are typically implemented in DLLs. The DLLs may be loaded into the address space of process 102 using one of two methods. In the first method, the DLL is automatically loaded into the address space of process 102 by the OS when an import library (.lib) for the DLL is specified at link-time. In that instance, the process IAT carries the locations of API functions and the calls to these functions are made using addresses stored in the IAT. In the second method, the DLL may be loaded on-demand, when a request is made by process 102 (e.g., via a loadlibrary). In this latter instance, process 102 may retrieve the address of a function to call from the EAT of the DLL by calling a system API (e.g., "GetProcAddress").

Figure 4:
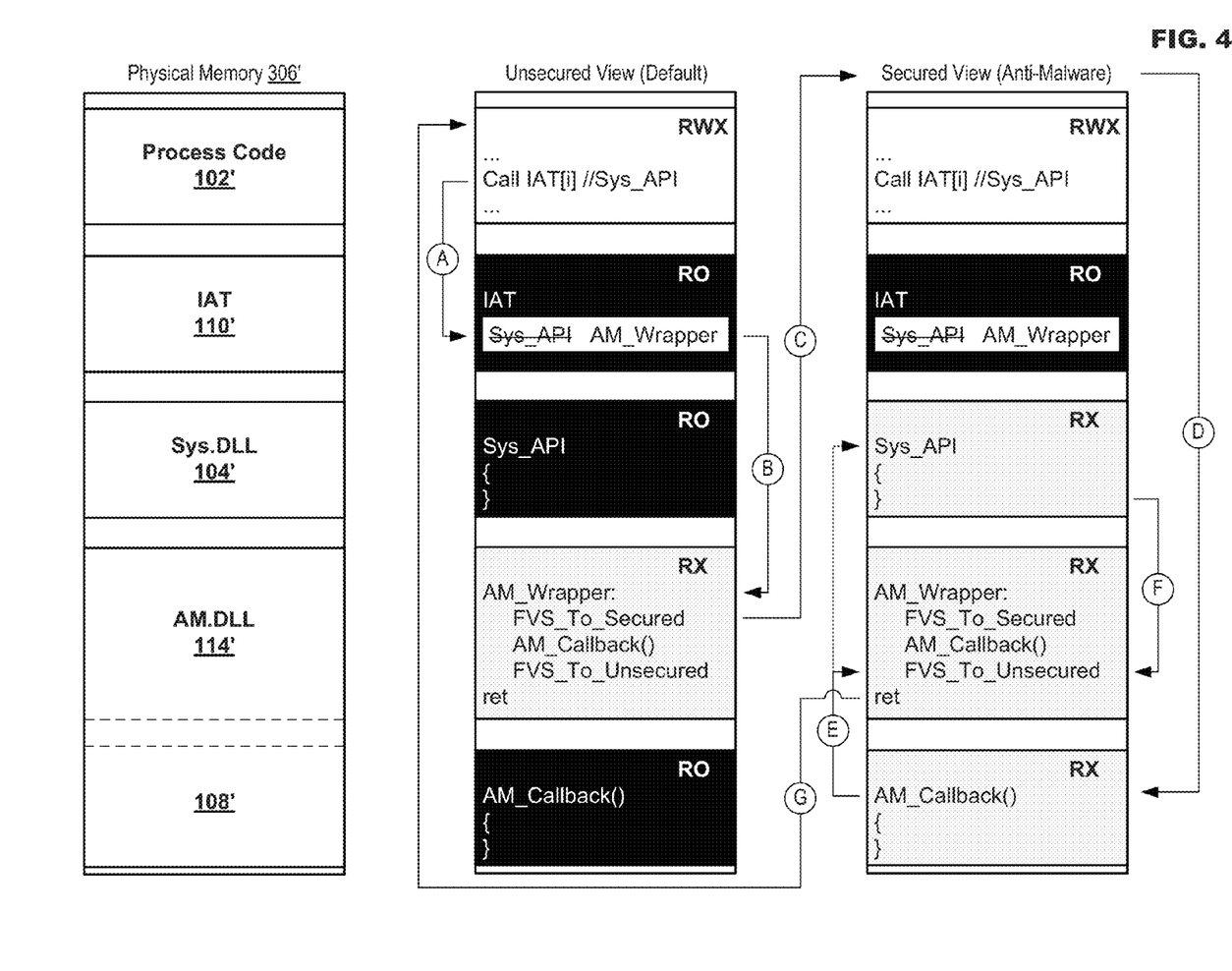
FIG. 4 illustrates example programmatic and hardware interactions in accordance with at least one embodiment of the present disclosure.

FIG. 4 illustrates example programmatic and hardware interactions in accordance with at least one embodiment of the present disclosure. While various programmatic structures derived from Windows OS (manufactured by the Microsoft Corporation) have been used for the sake of explanation herein, embodiments consistent with the present disclosure are not limited to use only with Windows OS, and may be employed in another OS in a similar manner. FIG. 4 also discloses use of IAT hooking, but may also operate in a similar manner when EAT hooking is employed. An example physical memory 306' (e.g., in memory module 204) may contain, for example, process code 102', IAT 110', Sys.DLL 104' (e.g., example system DLL corresponding to stored information 104 in FIG. 1) and AM.DLL 114' and 108' (e.g., example security software comprising sections corresponding to security initiator 114 and security validator 108 in FIG. 1).

FIG. 4 is based on some prerequisites that help to clarify the explanation of the illustrated example. Views including an "Unsecured View (Default)" and "Secured View (Anti-Malware)" (e.g., "AM") have been configured to control access to various memory pages. A system DLL (e.g., Sys.DLL 104') has exported a function (e.g., Sys_API) that was loaded into the address space of process 102'. Security software (e.g., AM.DLL 114' and 108') was also loaded into the address space of process 102'. AM.DLL 114' and 108' includes monitoring callback function AM_Callback 108' (e.g., corresponding to security validator 108), security wrapper function AM_Wrapper 114' (e.g., corresponding to security initiator 114) and other support functions configured to facilitate view control and transition to AM_Callback 108'. In the entry in IAT 110' referring to Sys_API, the address of SYS DLL 104' has been replaced with the address of AM_Wrapper 114'. Moreover, "Virtual Protect" and other system APIs that allow modification of page permissions in the OS page table are also being monitored by AM.DLL 108' and 114' in device 100.

In one embodiment the unsecured view may be the default view for device 100 (e.g., device 100 may operate primarily in the unsecured view unless activities, such as the following, result in a view change). As illustrated in FIG. 4, in the unsecured view process code 102' may have read-write-execute (RWX) permission, AM_Wrapper 114' may have read-execute (RX) permission, and IAT 110', Sys.DLL 104' and AM_Callback 108' may have read-only (RO) permission. RO permission protects these modules and/or elements from being altered when device 100 is in the unsecured view (e.g., by malware). Process code 102' may then attempt to call the function Sys_API using IAT 110' as shown at "A". However, the address of Sys_API has been replaced with the address of AM_Wrapper 114', causing the call to be redirected to AM_Wrapper 114' as shown at "B". In response to receiving the call, AM_Wrapper 114' may execute various security-related functions. Initially, the FVS_To_Secured function may be called to activate the secured (anti-malware) view as shown at "C". For example, FVS_To_Secured may instruct processing module 202 to activate the secured view in device 100'. The secured view is deemed the "Anti-Malware" view because it is in this view where AM_Callback 108' may execute. More specifically, in the secured view the permissions of Sys.DLL 104' and AM_Callback 108' are set to RX. AM_Callback 108' may then execute as shown at "D" to determine whether the call is valid. In one embodiment, determining the validity of a call may include, for example, identifying the source of the call and determining whether the source is malware. Based on the determination, AM_Callback 108' may either permit Sys_API to be called (e.g., may pass the call to Sys_API) or may return to AM_Wrapper 114' to cause the unsecured view to be activated (e.g., may execute the FVS_To_Unsecured function) to protect device 100 from potential malware as shown at "E". If the call is passed to Sys_API, the FVS_To_Unsecured function may later be executed as shown at "F". At "G" the device may return to the unsecured view. In one embodiment, if returning to the unsecured view from a previous determination by AM_Callback 108' that the calling process was malware, further software-based and/or hardware based protection measures may be performed such as, for example, alerting a user as to the presence of potential malware on device 100, identifying process code 102' as malware, killing the active process and/or deleting process code 102', etc.

At least one advantage of using views such as disclosed in the example of FIG. 4 is that actual enforcement of permissions is facilitated using hardware-based monitoring. For example, if a process (e.g., malware) attempts to do something that violates the permissions established in the unsecured view, the hardware may transition control to the VMM, allowing it to intervene, suspend lower privilege operations, evaluate the situation and possibly perform correction (e.g., protective) actions. An example of hardware intervention based on permission errors may be seen PCT/US2011/64817 by the same inventors. However, it is noted that this operation may occur only in extreme cases as frequent intervention by the VMM may, in some instances, cause significant performance degradation in device 100.

Figure 5:
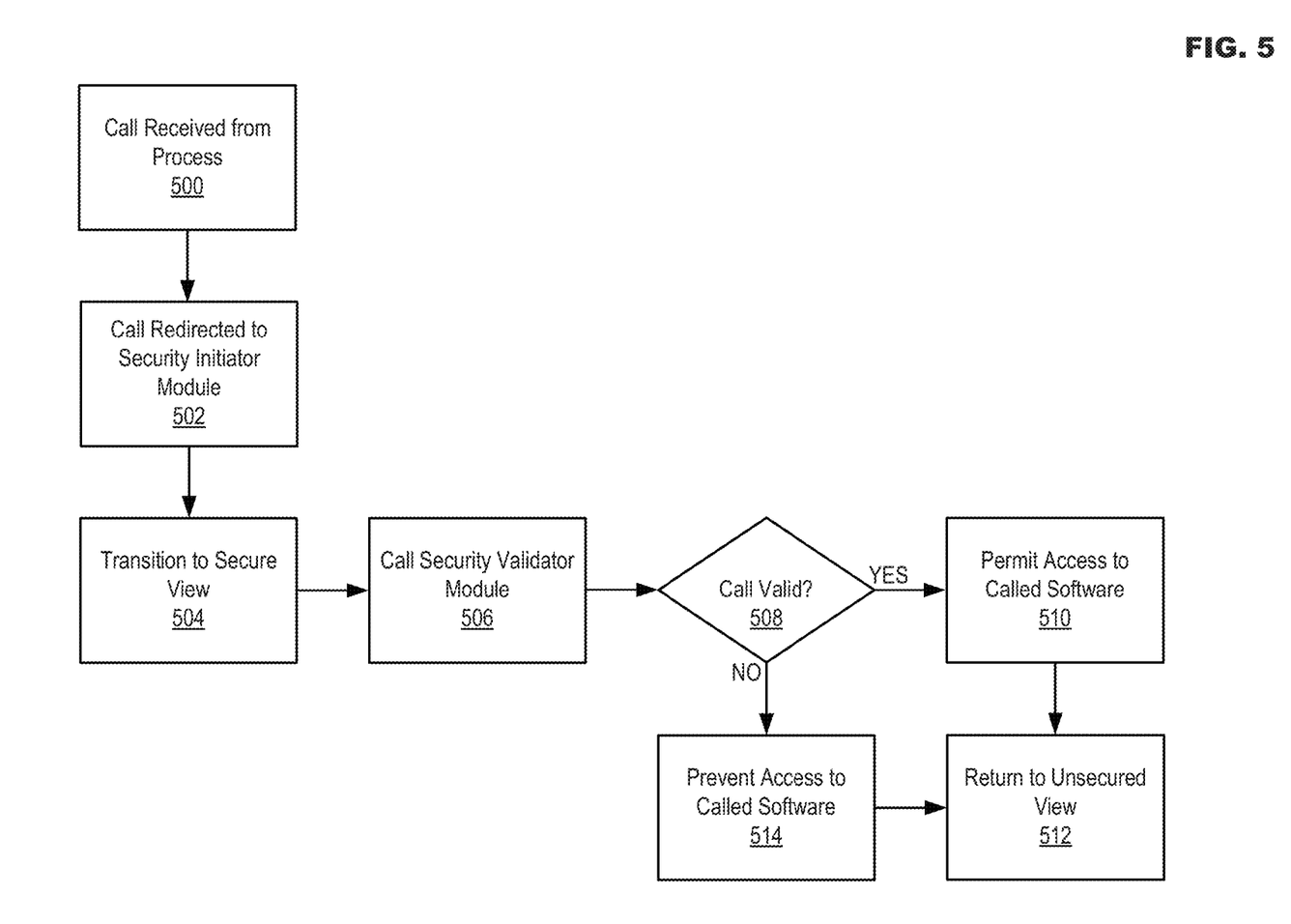
FIG. 5 illustrates a flowchart of example operations for hardware-enforced protection from malicious software in accordance with at least one embodiment of the present disclosure.

FIG. 5 illustrates a flowchart of example operations for hardware-enforced protection from malicious software in accordance with at least one embodiment of the present disclosure. In operation 500 a call may be received from a process executing in a device. The call may have been intended for information stored in the device (e.g., may be a request to execute or alter the stored information), but may instead be redirected to a security initiator module in operation 502. In operation 504 the security initiator module may cause a view switch in the device, wherein the view switches from an unsecured view to a secured view. In the secured view, a security validator module may become accessible and may be executed so that it may determine the validity of the received call (e.g., if the call originated from malware) in operation 508. If in operation 508 it is determined that the received call is valid, then in operation 510 access to the called software may be permitted (e.g., the call may be passed to the software function originally intended by the call) and the device may then return to the unsecured view in operation 512. Otherwise, if in operation 508 it is determined that the call originated from malware then access to the called software may be prevented in operation 514. Preventing access to the called software may include causing the device to return to the unsecured view in operation 512 without allowing the software intended by the call to be accessed. In one embodiment, upon determining that the call was invalid further activities may occur before or after returning to the unsecured view such as issuing a notification that potential malware was detected, identifying process code associated with the process as malware, killing the invalid process and/or deleting process code associated with the invalid process, etc.

While FIG. 5 illustrates various operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure provides systems and methods for hardware-enforced protection from malicious software. A device may include at least a security validator module and a security initiator module. A call from a process requesting access to information stored in the device may be redirected to the security initiator module, which may cause the device to change from an unsecured view to a secured view. In the secured view the security validator module may determine whether the call came from malicious software. If the call is determined to be valid, then access to the stored information may be permitted. If the call is determined to be invalid (e.g., from malware), the security software may cause the device to return to the unsecured view without allowing the stored information to be accessed, and may take further measures to identify and/or eliminate process code associated with the process that made the invalid call.

The following examples pertain to further embodiments. In one example embodiment there is provided a device. The device may include a security validator module configured to determine whether processes executing in the device should be granted access to information stored on the device, and a security initiator module configured to control hardware-enforced security views based on requests to access the stored information received from the executing processes.

The above example device may be further configured, wherein the hardware-enforced security views include at least an unsecured view and a secured view. In this configuration the example device may be further configured, wherein the security initiator module is further configured to cause a processor in the device to switch between the unsecured view and the secured view using a fast view switching assist without having to transition to a special privilege mode in the processor. In this configuration the example device may be further configured, wherein the security validator module and the stored information cannot be executed or altered when the security initiator activates the unsecured view. In this configuration, the example device may be further configured, wherein the security initiator module is further configured to cause a hardware-based security event to occur if an attempt is made to execute or alter the security validator module or the stored information when the unsecured view is activated. In this configuration, the example device may be further configured, wherein the security validator module or the security initiator module is further configured to change at least one address of an import address table (IAT) in the device, the at least one address being changed from corresponding to the stored information to corresponding to the security initiator. In this configuration, the example device may be further configured, wherein the at least one address corresponding to the security initiator cannot be altered when the device is in the unsecured view. In this configuration, the example device may be further configured, wherein the security initiator module is further configured to initiate a transition from the unsecured view to the secured view and to activate the security validator module upon receiving a request to access the stored information from an executing process, the security validator module being further configured to determine if the request is valid. In this configuration, the example device may be further configured, wherein the security validator module is further configured to grant the executing process access to the stored information prior to causing the security initiator module to initiate a transition from the secured view to the unsecured view based on the determination that the request is valid. In this configuration the example device may be further configured, wherein the security validator module is further configured to cause the security initiator module to initiate a transition from the secured view to the unsecured view without granting access to the stored information based on the determination that the request is invalid.

In another example embodiment there is presented a method. The method may include receiving a request from a process to access to information stored in a device, activating a hardware-enforced security view based on receiving the request, determining if the request is valid, and controlling access to the stored information based on the validity determination.

The above example method may be further configured, wherein receiving the request comprises redirecting the request from accessing the stored information to a security initiator module in the device. In this configuration the example method may be further configured, wherein redirecting the request comprises changing at least one address of an import address table (IAT) in the device, the at least one address being changed from corresponding to the stored information to corresponding to the security initiator. In this configuration the example method may be further configured, wherein the at least one address corresponding to the security initiator cannot be altered when the device is in the unsecured view.

The above example method may be further configured, wherein activating a hardware-enforced security view comprises transitioning from an unsecured view to a secured view in the device, a security validator module and the stored information being inexecutable or unalterable in the unsecured view and executable or alterable in the secured view. In this configuration the example method may be further configured, wherein transitioning from an unsecured view to a secured view comprises causing a processor in the device to switch between the unsecured view and the secured view using a fast view switching assist without having to transition to a special privilege mode in the processor. In this configuration, the example method may further comprise causing a hardware-based security event to occur in the device if an attempt is made to access the security validator module or the stored information when in the unsecured view. In this configuration the example method may be further configured, wherein determining if the request is valid is performed by the security validator module. In this configuration the example method may be further configured, wherein controlling access to the stored information comprises granting access to the stored information prior to initiating a transition from the secured view to the unsecured view based on the determination that the request is valid, or initiating a transition from the secured view to the unsecured view without granting access to the stored information based on the determination that the request is invalid.

In another example embodiment there is provided a system comprising at least a device, the system being arranged to perform any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry out any of the above example methods.

In another example embodiment there is provided an apparatus configured for hardware-enforced protection from malicious software, the apparatus being arranged to perform any of the above example methods.

In another example embodiment there is provided a device. The device may include a security validator module configured to determine whether processes executing in the device should be granted access to information stored on the device, and a security initiator module configured to control hardware-enforced security views based on requests to access the stored information received from the executing processes.

The above example device may be further configured, wherein the hardware-enforced security views include at least an unsecured view and a secured view. In this configuration the example device may be further configured, wherein the security initiator module is further configured to cause a processor in the device to switch between the unsecured view and the secured view using a fast view switching assist without having to transition to a special privilege mode in the processor. In this configuration the example device may be further configured, wherein the security validator module and the stored information cannot be altered or executed when the security initiator activates the unsecured view, the security initiator module being further configured to cause a hardware-based security event to occur if an attempt is made to alter or execute the security validator module or the stored information when the unsecured view is activated. In this configuration the example device may be further configured, wherein the security validator module or the security initiator module is further configured to change at least one address of an import address table (IAT) in the device, the at least one address being changed from corresponding to the stored information to corresponding to the security initiator, the at least one address corresponding to the security initiator not being alterable when the device is in the unsecured view. In this configuration the example device may be further configured, wherein the security initiator module is further configured to initiate a transition from the unsecured view to the secured view and to activate the security validator module upon receiving a request to access the stored information from an executing process, the security validator module being further configured to determine if the request is valid. In this configuration the example device may be further configured, wherein the security validator module is further configured to grant the executing process access to the stored information prior to causing the security initiator module to initiate a transition from the secured view to the unsecured view based on the determination that the request is valid, and to cause the security initiator module to initiate a transition from the secured view to the unsecured view without granting access to the stored information based on the determination that the request is invalid.

In another example embodiment there is provided a method. The device may include receiving a request from a process to access to information stored in a device, activating a hardware-enforced security view based on receiving the request, determining if the request is valid, and controlling access to the stored information based on the validity determination.

The above example method may be further configured, wherein receiving the request comprises redirecting the request from accessing the stored information to a security initiator module in the device, redirecting the request comprising changing at least one address of an import address table (IAT) in the device, the at least one address being changed from corresponding to the stored information to corresponding to the security initiator, the at least one address corresponding to the security initiator not being alterable when the device is in the unsecured view.

The above example method may be further configured, wherein activating a hardware-enforced security view comprises transitioning from an unsecured view to a secured view in the device, a security validator module and the stored information being inexecutable or unalterable in the unsecured view and executable or alterable in the secured view. In this configuration the example method may be further configured, wherein transitioning from an unsecured view to a secured view comprises causing a processor in the device to switch between the unsecured view and the secured view using a fast view switching assist without having to transition to a special privilege mode in the processor. In this configuration the example method may be further configured, wherein controlling access to the stored information comprises granting access to the stored information prior to initiating a transition from the secured view to the unsecured view based on the determination that the request is valid, or initiating a transition from the secured view to the unsecured view without granting access to the stored information based on the determination that the request is invalid.

In another example embodiment there is provided a system comprising at least a device, the system being arranged to perform any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry out any of the above example methods.

In another example embodiment there is provided a device. The device may include a security validator module configured to determine whether processes executing in the device should be granted access to information stored on the device, and a security initiator module configured to control hardware-enforced security views based on requests to access the stored information received from the executing processes.

The above example device may be further configured, wherein the hardware-enforced security views include at least an unsecured view and a secured view. In this configuration the example device may be further configured, wherein the security initiator module is further configured to cause a processor in the device to switch between the unsecured view and the secured view using a fast view switching assist without having to transition to a special privilege mode in the processor. In this configuration the example device may be further configured, wherein the security validator module and the stored information cannot be executed or altered when the security initiator activates the unsecured view. In this configuration, the example device may be further configured, wherein the security initiator module is further configured to cause a hardware-based security event to occur if an attempt is made to execute or alter the security validator module or the stored information when the unsecured view is activated. In this configuration, the example device may be further configured, wherein the security validator module or the security initiator module is further configured to change at least one address of an import address table (IAT) in the device, the at least one address being changed from corresponding to the stored information to corresponding to the security initiator. In this configuration, the example device may be further configured, wherein the at least one address corresponding to the security initiator cannot be altered when the device is in the unsecured view. In this configuration, the example device may be further configured, wherein the security initiator module is further configured to initiate a transition from the unsecured view to the secured view and to activate the security validator module upon receiving a request to access the stored information from an executing process, the security validator module being further configured to determine if the request is valid. In this configuration, the example device may be further configured, wherein the security validator module is further configured to grant the executing process access to the stored information prior to causing the security initiator module to initiate a transition from the secured view to the unsecured view based on the determination that the request is valid. In this configuration the example device may be further configured, wherein the security validator module is further configured to cause the security initiator module to initiate a transition from the secured view to the unsecured view without granting access to the stored information based on the determination that the request is invalid.

In another example embodiment there is presented a method. The method may include receiving a request from a process to access to information stored in a device, activating a hardware-enforced security view based on receiving the request, determining if the request is valid, and controlling access to the stored information based on the validity determination.

The above example method may be further configured, wherein receiving the request comprises redirecting the request from accessing the stored information to a security initiator module in the device. In this configuration the example method may be further configured, wherein redirecting the request comprises changing at least one address of an import address table (IAT) in the device, the at least one address being changed from corresponding to the stored information to corresponding to the security initiator. In this configuration the example method may be further configured, wherein the at least one address corresponding to the security initiator cannot be altered when the device is in the unsecured view.

The above example method may be further configured, wherein activating a hardware-enforced security view comprises transitioning from an unsecured view to a secured view in the device, a security validator module and the stored information being inexecutable or unalterable in the unsecured view and executable or alterable in the secured view. In this configuration the example method may be further configured, wherein transitioning from an unsecured view to a secured view comprises causing a processor in the device to switch between the unsecured view and the secured view using a fast view switching assist without having to transition to a special privilege mode in the processor. In this configuration, the example method may further comprise causing a hardware-based security event to occur in the device if an attempt is made to access the security validator module or the stored information when in the unsecured view. In this configuration the example method may be further configured, wherein determining if the request is valid is performed by the security validator module. In this configuration the example method may be further configured, wherein controlling access to the stored information comprises granting access to the stored information prior to initiating a transition from the secured view to the unsecured view based on the determination that the request is valid, or initiating a transition from the secured view to the unsecured view without granting access to the stored information based on the determination that the request is invalid.

In another example embodiment there is provided a system. The system may include means for receiving a request from a process to access to information stored in a device, means for activating a hardware-enforced security view based on receiving the request, means for determining if the request is valid, and means for controlling access to the stored information based on the validity determination.

The above example system may be further configured, wherein receiving the request comprises redirecting the request from accessing the stored information to a security initiator module in the device. In this configuration the example system may be further configured, wherein redirecting the request comprises changing at least one address of an import address table (IAT) in the device, the at least one address being changed from corresponding to the stored information to corresponding to the security initiator. In this configuration the example system may be further configured, wherein the at least one address corresponding to the security initiator cannot be altered when the device is in the unsecured view.

The above example system may be further configured, wherein activating a hardware-enforced security view comprises transitioning from an unsecured view to a secured view in the device, a security validator module and the stored information being inexecutable or unalterable in the unsecured view and executable or alterable in the secured view. In this configuration the example system may be further configured, wherein transitioning from an unsecured view to a secured view comprises causing a processor in the device to switch between the unsecured view and the secured view using a fast view switching assist without having to transition to a special privilege mode in the processor. In this configuration the example system may further comprise means for causing a hardware-based security event to occur in the device if an attempt is made to access the security validator module or the stored information when in the unsecured view. In this configuration the example system may be further configured, wherein determining if the request is valid is performed by the security validator module. In this configuration the example system may be further configured, wherein controlling access to the stored information comprises granting access to the stored information prior to initiating a transition from the secured view to the unsecured view based on the determination that the request is valid, or initiating a transition from the secured view to the unsecured view without granting access to the stored information based on the determination that the request is invalid.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
    a memory;
    one or more processors; and
    instructions resident in the memory and operable for execution by the one or more processors, comprising:
        a security validator module; and
        a security initiator module configured to initiate a transition from an unsecured view to a secured view and activate the security validator module, upon receiving a request from a process executing in the device to access information stored in the memory, wherein the unsecured view and the secured view set read-write-execute permissions for certain sections of memory pages in the memory;
        wherein the security validator module is configured to determine if the request is valid and control access to the stored information based on the validity determination; and
        based on the determination that the request is invalid, the security validator module is further configured to cause the security initiator module to initiate a transition from the secured view to the unsecured view without granting access to the stored information.

2. The device of claim 1, wherein the security initiator module is further configured to cause a processor in the device to switch between the unsecured view and the secured view using a fast view switching assist without having to transition to a special privilege mode in the processor.

3. The device of claim 1, wherein the security validator module and the stored information cannot be altered or executed when the security initiator activates the unsecured view.

4. The device of claim 3, wherein the security initiator module is further configured to cause a hardware-based security event to occur if an attempt is made to alter or execute the security validator module or the stored information when the unsecured view is activated.

5. The device of claim 1, wherein the security validator module or the security initiator module is further configured to change at least one address of an import address table (IAT) in the device, the at least one address being changed from corresponding to the stored information to corresponding to the security initiator.

6. The device of claim 5, wherein the at least one address corresponding to the security initiator cannot be altered when the device is in the unsecured view.

7. The device of claim 1, wherein the security validator module is further configured to grant the executing process access to the stored information prior to causing the security initiator module to initiate a transition from the secured view to the unsecured view based on the determination that the request is valid.

8. A method, comprising:
    receiving a request from a process to access information stored in a memory in a device;
    upon receiving the request, initiating a transition from an unsecured view to a secured view and activating a security validator module, wherein the unsecured view and the secured view set read-write-execute permissions for certain sections of memory pages in the memory;
    determining if the request is valid; and
    controlling access to the stored information based on the validity determination;
    wherein controlling access to the stored information comprises initiating a transition from the secured view to the unsecured view without granting access to the stored information based on the determination that the request is invalid.

9. The method of claim 8, wherein receiving the request comprises redirecting the request from accessing the stored information to a security initiator module in the device.

10. The method of claim 9, wherein redirecting the request comprises changing at least one address of an import address table (IAT) in the device, the at least one address being changed from corresponding to the stored information to corresponding to the security initiator.

11. The method of claim 10, wherein the at least one address corresponding to the security initiator cannot be altered when the device is in the unsecured view.

12. The method of claim 8, wherein the security validator module and the stored information are inexecutable or unalterable in the unsecured view and executable or alterable in the secured view.

13. The method of claim 12, wherein transitioning from an unsecured view to a secured view comprises causing a processor in the device to switch between the unsecured view and the secured view using a fast view switching assist without having to transition to a special privilege mode in the processor.

14. The method of claim 12, further comprising causing a hardware-based security event to occur in the device if an attempt is made to access the security validator module or the stored information when in the unsecured view.

15. The method of claim 12, wherein determining if the request is valid is performed by the security validator module.

16. The method of claim 15, wherein controlling access to the stored information comprises granting access to the stored information prior to initiating a transition from the secured view to the unsecured view based on the determination that the request is valid.

17. A system comprising at least one non-transitory machine- readable storage medium having stored thereon, individually or in combination, instructions that when executed by one or more processors result in the following operations comprising:
    receiving a request from a process to access information stored in a memory in a device;
    upon receiving the request, initiating a transition from an unsecured view to a secured view and activating a security validator module, wherein the unsecured view and the secured view set read-write-execute permissions for certain sections of memory pages in the memory;
    determining if the request is valid; and
    controlling access to the stored information based on the validity determination;

wherein controlling access to the stored information comprises initiating a transition from the secured view to the unsecured view without granting access to the stored information based on the determination that the request is invalid.

18. The system of claim 17, wherein receiving the request comprises redirecting the request from accessing the stored information to a security initiator module in the device.

19. The system of claim 18, wherein redirecting the request comprises changing at least one address of an import address table (IAT) in the device, the at least one address being changed from corresponding to the stored information to corresponding to the security initiator.

20. The system of claim 19, wherein the at least one address corresponding to the security initiator cannot be altered when the device is in the unsecured view.

21. The system of claim 17, wherein the security validator module and the stored information are inexecutable or unalterable in the unsecured view and executable or alterable in the secured view.

22. The system of claim 21, wherein transitioning from an unsecured view to a secured view comprises causing a processor in the device to switch between the unsecured view and the secured view using a fast view switching assist without having to transition to a special privilege mode in the processor.

23. The system of claim 21, further comprising instructions that when executed by one or more processors result in the following operations comprising:
causing a hardware-based security event to occur in the device if an attempt is made to access the security validator module or the stored information when in the unsecured view.

24. The system of claim 21, wherein determining if the request is valid is performed by the security validator module.

25. The system of claim 24, wherein controlling access to the stored information comprises granting access to the stored information prior to initiating a transition from the secured view to the unsecured view based on the determination that the request is valid.

* * * * *